United States Patent
Martens (10) Patent No.: US 11,680,519 B1
(45) Date of Patent: Jun. 20, 2023

(54) PRECOMBUSTION NITRIC OXIDE EXCHANGE CHAMBER (NOEC)

(71) Applicant: Thomas Martens, Rock Island, IL (US)

(72) Inventor: Thomas Martens, Rock Island, IL (US)

(*) Notice: Subject to any disclaimer, the term of this patent is extended or adjusted under 35 U.S.C. 154(b) by 46 days.

(21) Appl. No.: 17/688,151

(22) Filed: Mar. 7, 2022

(51) Int. Cl.
  *F02B 51/04* (2006.01)
  *F02M 27/04* (2006.01)

(52) U.S. Cl.
  CPC ........... *F02B 51/04* (2013.01); *F02M 27/045* (2013.01)

(58) Field of Classification Search
  CPC .............................. F02B 51/04; F02M 27/045
  See application file for complete search history.

(56) References Cited

U.S. PATENT DOCUMENTS

| | | | |
|---|---|---|---|
| 6,990,965 B2 | 1/2006 | Varasundharosoth et al. | |
| 8,365,708 B2 | 2/2013 | Evangelista | |
| 2007/0137917 A1* | 6/2007 | Nakamoto | A63B 55/61 180/293 |
| 2008/0006249 A1* | 1/2008 | Evangelista | F02M 27/04 123/536 |

FOREIGN PATENT DOCUMENTS

EP   1783352 A1 *  5/2007  ........... F02M 27/045

* cited by examiner

*Primary Examiner* — Jacob M Amick
*Assistant Examiner* — Charles J Brauch
(74) *Attorney, Agent, or Firm* — Dale J. Ream (57) ABSTRACT

An air intake apparatus for a combustion engine includes an air intake tube for receiving an unmodified ambient air stream from outside the engine. The apparatus includes a first stream modifier chamber for receiving the unmodified ambient air stream that includes a plurality of spark plugs operative to generate nitric oxide when electrically energized such that the unmodified ambient air stream is modified into a first modified air stream rich in nitric oxide. The apparatus includes a second stream modifier chamber positioned downstream from the first and including a GMX400 magnet in magnetic communication with the air intake tube that causes additional oxygen atoms from the first modified air stream to combine with the first modified air stream. The enhanced air stream travels downstream and is combined with fuel and combusted, an exhaust stream thereof having at least 20% less carbon dioxide than a traditional exhaust stream.

22 Claims, 6 Drawing Sheets

PRECOMBUSTION NITRIC OXIDE EXCHANGE CHAMBER (NOEC)

BACKGROUND OF THE INVENTION

This invention relates generally to automobile air intake systems and, more particularly, to a precombustion air intake apparatus for modifying an ambient air stream to include an increased volume of nitric oxide and oxygen before traditional mixture with fuel and combustion thereof, whereby to provide a more complete internal combustion and to enhance emission and fuel efficiency. This invention results in fewer harmful emissions, increased fuel economy, and increased horsepower.

Fuel efficiency and automobiles is important for many reasons. First, fuel efficient vehicles require less gas to go a given distance. When we burn less gas, we cut global warming emissions and produce less pollution, while spending less on gas. Another way of increasing fuel efficiency in automobiles may be use of alternative fuel sources. Although presumably effective for their intended purposes, the methods proposed in the art may still be inadequate in view of the present invention.

Therefore, it would be desirable to have a precombustion air intake apparatus for modifying an incoming ambient air stream to include an increased volume of nitric oxide and oxygen before traditional mixture with fuel and combustion thereof, whereby to provide a more complete internal combustion and to enhance emission and fuel efficiency of the engine.

SUMMARY OF THE INVENTION

An air intake apparatus according to the present invention that improves fuel economy of a combustion engine by modifying an air stream upstream of being mixed with fuel and combusted includes an air intake tube defining a channel extending between opposed inlet and outlet ends, the inlet end being configured to receive an unmodified ambient air stream from outside the combustion engine and the outlet end being in communication with a combustion assembly associated with the combustion engine. The apparatus includes a first stream modifier chamber positioned adjacent the inlet end of the air intake tube for operatively receiving the unmodified ambient air stream, the first stream modifier chamber having a plurality of spark plugs operative to generate nitric oxide and hydrocarbons when electrically energized such that the unmodified ambient air stream is modified into a first modified air stream that is rich in nitric oxide and hydrocarbons. The apparatus includes a second stream modifier chamber positioned downstream from and in fluid communication with the first stream modifier chamber, the second stream modifier chamber including at least one magnet in magnetic communication with the air intake tube that causes additional oxygen atoms from the ambient air stream to combine with the hydrocarbons associated with the first modified air stream so as to form a second modified air stream rich in nitric oxide and carbon dioxide.

Once the twice enhanced air stream travels downstream and is combined with fuel and combusted, an exhaust stream exits the engine and can be analyzed. By the invention described herein, the exhaust stream has been shown to have at least 20% less carbon dioxide than a traditional exhaust stream, i.e., to be more fully combusted and significantly cleaner.

Therefore, a general object of this invention is to provide an air intake apparatus for modifying an incoming ambient air stream to include an increased volume of nitric oxide, hydrocarbons, and oxygen before traditional mixture with fuel and combustion thereof, whereby to provide a more complete internal combustion and to enhance emission and fuel efficiency of the engine.

Another object of this invention is to provide an air intake apparatus, as aforesaid, which includes a plurality of auxiliary spark plugs for simulating lightning strikes so as to increase production of nitric oxide and hydrocarbons in the air stream.

Still another object of this invention is to provide an air intake apparatus, as aforesaid, having a series of GMX400 magnets that cause more oxygen to combine with the modified air stream.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 3b is a sectional view taken along lines 3b-3b taken from FIG. 3a;

FIG. 3c is a sectional view taken along lines 3c-3c taken from FIG. 3a;

DESCRIPTION OF THE PREFERRED EMBODIMENT

A precombustion air intake apparatus according to a preferred embodiment of the present invention will now be described with reference to FIG. 1 to 4 of the accompanying drawings. The precombustion air intake apparatus 10 includes an air intake tube 20 extending longitudinally between an air filter 16 and a traditional intake and combustion assembly (also referred to as a manifold) of an automobile, a first stream modifier chamber 30 and a second stream modifier chamber 40 situated in series along the air intake tube 20.

In a critical aspect, the precombustion air intake apparatus 10 includes an air intake tube 20 having a linear and cylindrical configuration that may extend longitudinally between a grill of an automobile and a manifold/combustion chamber associated with a combustion engine associated with the automobile. As specifically shown in the accompanying illustrations, the air intake apparatus 10 illustrates an air intake tube 20 having an inlet end 22 in fluid communication with an air filter 16 associated with an automobile and an outlet end 24 opposite the inlet end 22 and that is in communication with the engine's traditional intake and combustion system, e.g., the engine intake assembly. It is understood that the automobile and its traditional intake and combustion system are not shown specifically in the drawings as their structure and function are well known and outside the scope of the present invention. In other words, the intake apparatus 10 is positioned in an internal combustion engine prior to and upstream of mixture and combustion of fuel and ambient air. Preferably, the air intake tube 20 has a cylindrical and tubular configuration that defines an internal channel 12 capable of receiving and transmitting a fluid flow, such as in airstream, in a downstream direction, e.g., flowing from the inlet end 22 toward the outlet end 24.

In the present invention, ambient air (i.e., air from outside and remote from the combustion engine) may be received into the inlet end 22 of the air intake to 20 as the automobile travels forwardly down a road, the stream of received air being referred to herein as an unmodified ambient air stream.

Figure 3A:
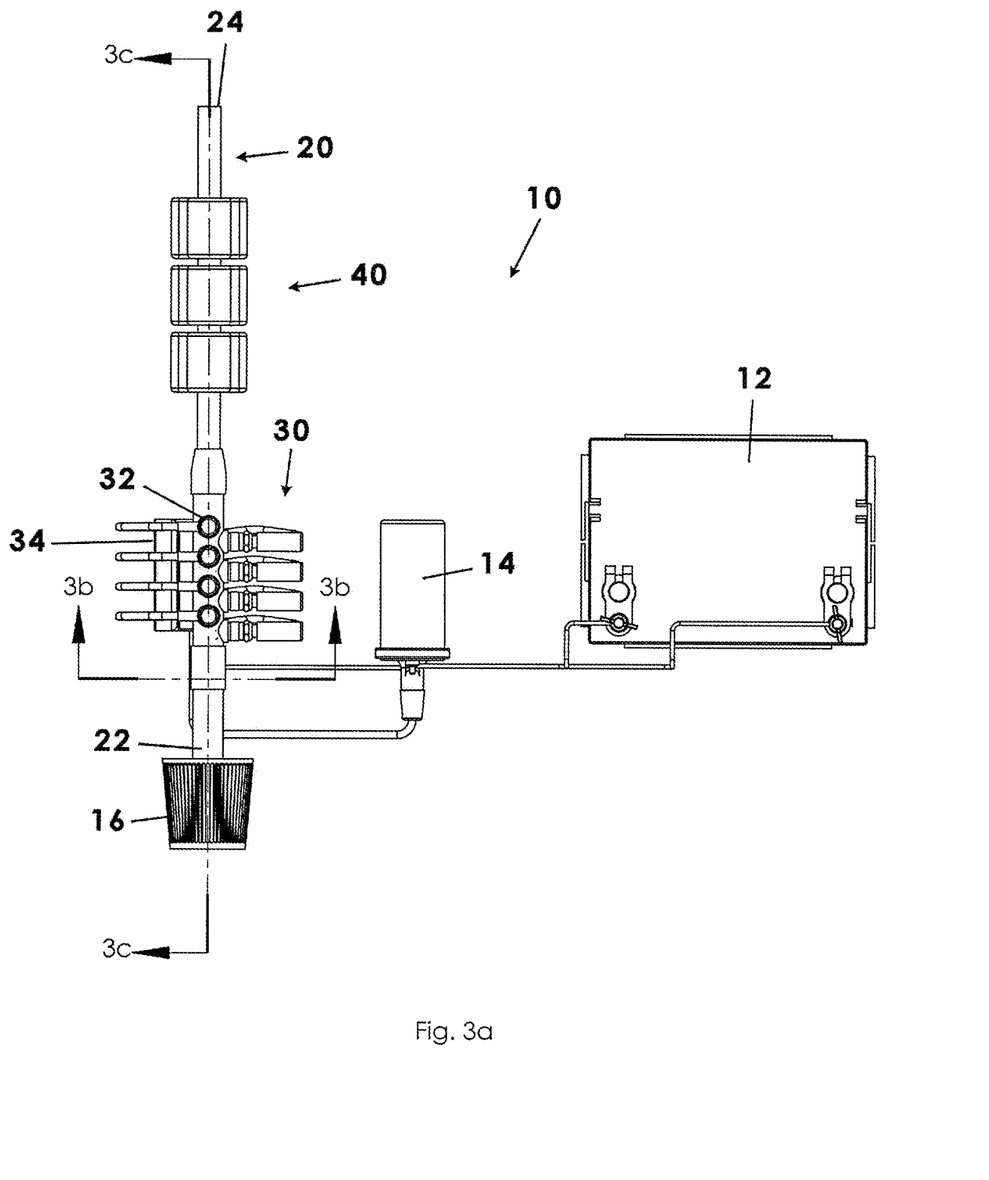
FIG. 3a is a top view of the air intake apparatus as in FIG. 1.
Figure 3B:
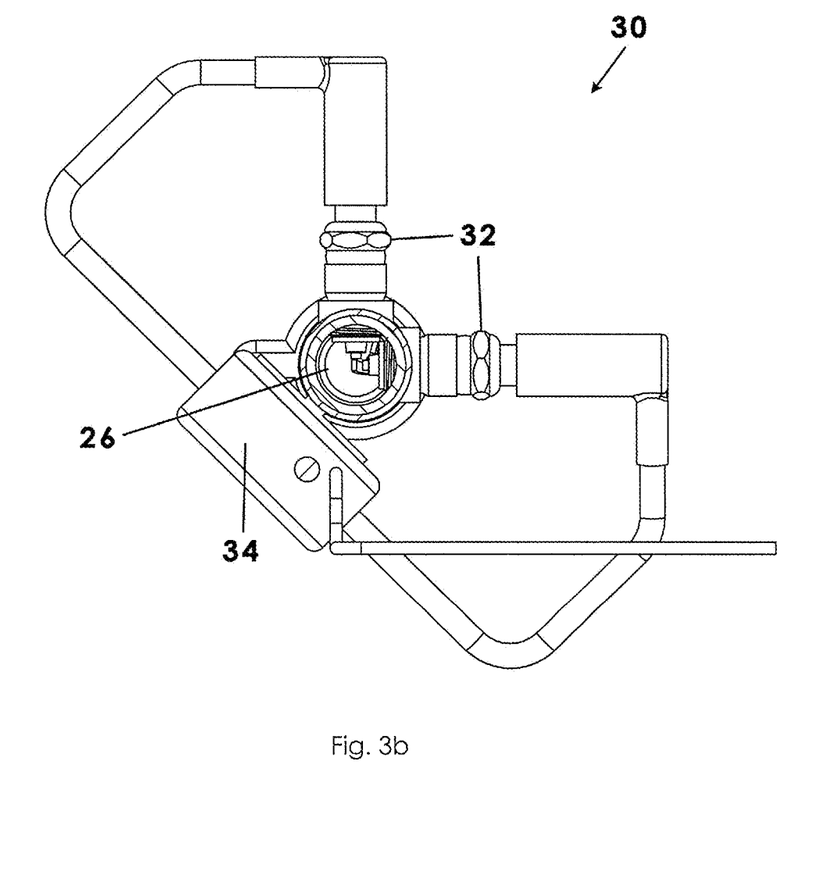

In another critical aspect, the precombustion air intake apparatus 10 may include a first stream modifier chamber 30 positioned along the air intake tube 20 proximate the inlet end thereof. Accordingly, the unmodified ambient air stream will flow downstream through the air intake tube 20 and, thus, through the first stream modifier chamber 30. More particularly, the first stream modifier chamber 30 may include at least one spark plug or similar structure that may be configured to selectively generate a spark of electricity directed at the unmodified ambient air stream flowing downstream through the air intake tube 20. In a preferred embodiment and as illustrated, the first stream modifier chamber 30 may include a cluster of eight spark plugs 32 each configured to generate, when energized, a spark into the channel 12 through which the airstream flows. Specifically, each spark has a high temperature that naturally induces nitrogen and oxygen in the unmodified ambient air stream to combine and form nitric oxide and hydrocarbons. Accordingly, the previously unmodified ambient air stream is modified (also referred to as being changed or enhanced) into what will be referred to as a first modified airstream that has an increased volume of nitric oxide. This may also be referred to as being "rich" in nitric oxide. It is also understood that a number of hydrocarbons may be formed by operation of the spark plug 32. The hydrocarbons are not considered waste but rather a will contribute to enhanced fuel economy as will be described later.

Figure 1:
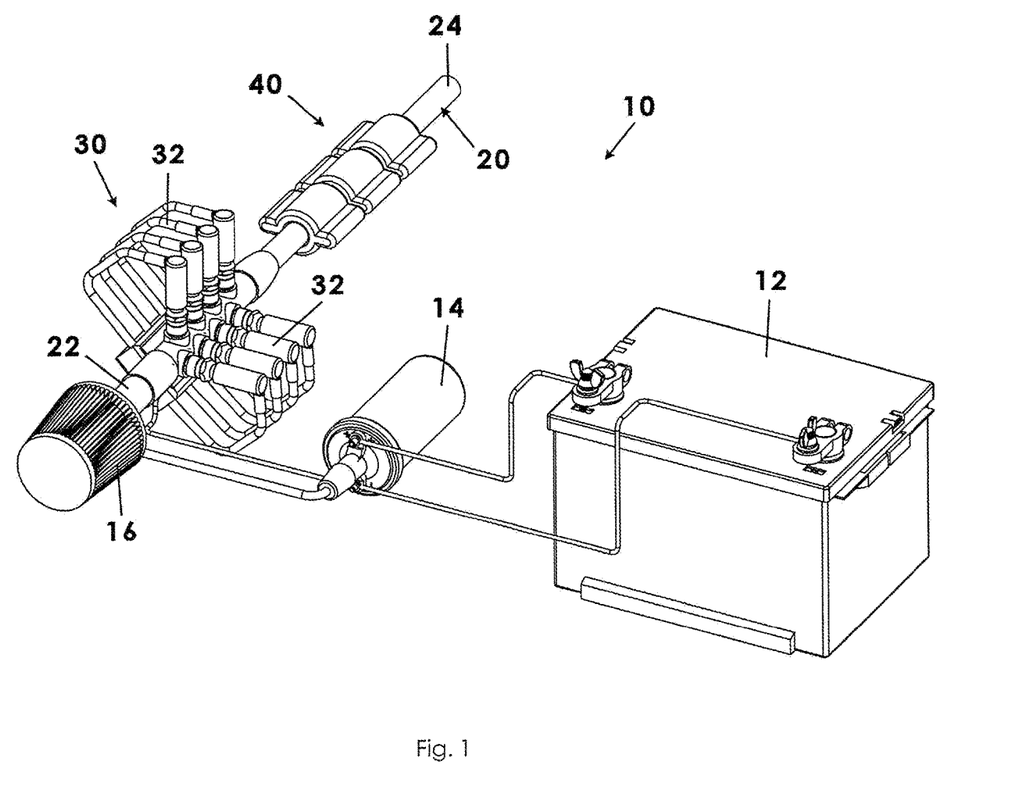
FIG. 1 is a perspective view of a combustion air intake apparatus according to a preferred embodiment of the present invention.
Figure 2:
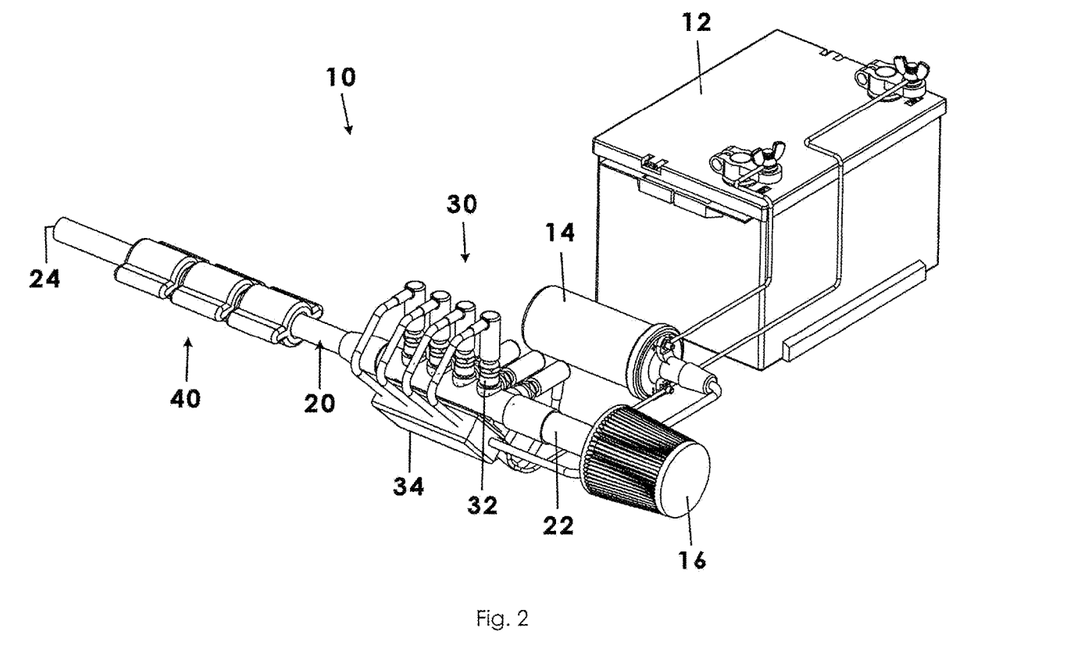
FIG. 2 is a perspective view from another angle of the air intake apparatus as in FIG. 1.

As shown, operation of the plurality of spark plugs 32 may be powered by current received from a vehicle battery 12 and regulated by an ignition controller 34 that is electrically connected to the plurality of spark plugs 32. In addition, an ignition coil 14 may be positioned intermediate the automobile battery 12 and the plurality of spark plugs 32. More particularly, the purpose of an ignition coil 14 is to convert the low voltage current from the vehicle battery into high voltage current capable of creating a spark in the spark plugs 32. Again, it is understood that the electrical connections whereby to generate sparks in spark plugs is well understood by electricians and automotive technicians and, therefore, will not be described in greater detail.

An airstream rich in nitric oxide is important in the airstream mixed with fuel and combusted in an internal combustion engine, i.e., so as to generate power, in that oxygen-rich fuels combust more thoroughly and with less waste product. Stated another way, more thorough combustion leads to cleaner exhaust streams and better fuel mileage. More particularly, nitric oxide, at room temperature, is a colorless, nonflammable, poisonous, oxidizing gas with an irritating odor. The gas is an oxidizer and will support and enhance combustion. In the presence of air, nitric oxide forms brown fumes of nitrogen dioxide and is extremely reactive and a strong oxidizing agent. Therefore, nitric oxide in combination with heightened levels of oxygen provide a heightened and more thorough volume of combustion energy for producing power to a combustion engine as will be described below in greater detail.

Figure 3C:
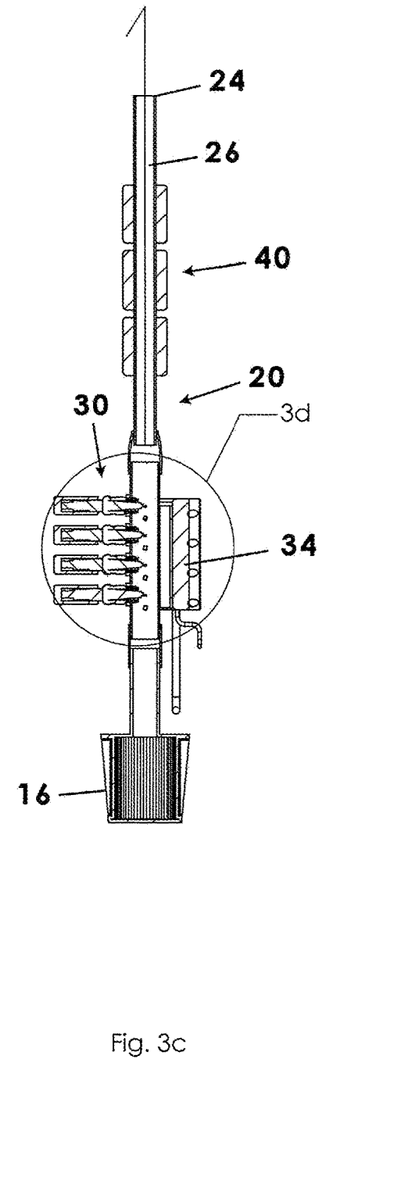
Figure 3D:
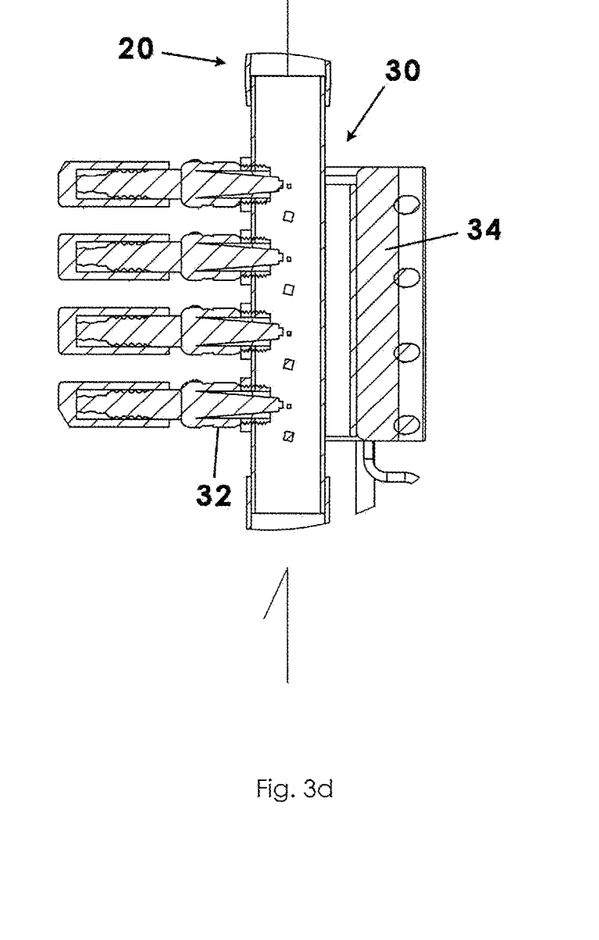
FIG. 3d is an isolated view is n an enlarged scale taken from FIG. 3c.

In another critical aspect, the precombustion air intake apparatus 10 may include a second stream modifier chamber 40 positioned along the air intake tube 20 proximate to a downstream of the first stream modifier chamber 30. In general, the second stream modifier chamber 40 include three GMX400 magnets 42 that generate a magnetic field directed at the airstream flowing downstream through the tube 20 so as to cause additional oxygen to combine with the hydrocarbons associated with the first modified airstream, thus forming a second modified airstream. It is understood that a remnant of the unmodified ambient air stream may also be passed downstream into the second modifier chamber 40 and from which additional oxygen is attracted to the hydrocarbons present in the first modified airstream. Obviously, increased oxygen is the greatest factor in aiding combustion. GMX400 magnets have two half portions configured to surround a fluid pipe and direct a magnetic field therethrough.

The action of a magnetic field on air has been shown in the medical field to increase absorption of oxygen, i.e., to increase the oxygen capacity of certain compounds exposed to the magnetic field. More particularly, oxygen gas is paramagnetic and easily attracted by magnets. Oxygen has two unpaired electrons in its outer electron orbits and these vacancies give the $O_2$ molecule a net spin, i.e., a movement of the electrons. Accordingly, the magnetic field associated with the second airstream modifier chamber 40 causes attraction of oxygen atoms for combination with the hydrocarbons. As a result, the oxygen rich airstream is, therefore, more completely combustible by an automobile engine.

Figure 4:
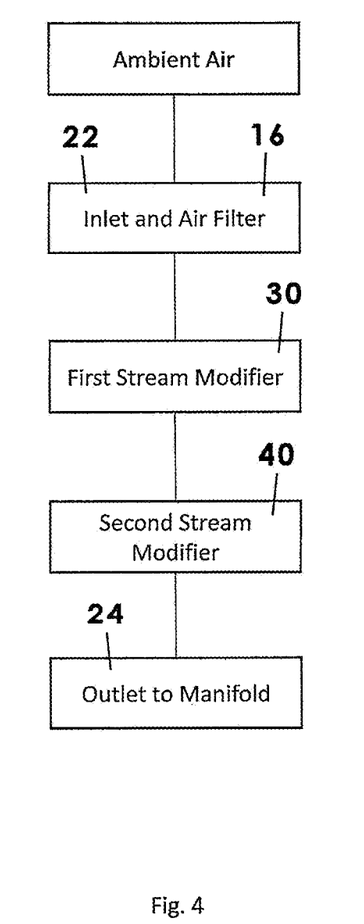
FIG. 4 is a flowchart of a method of air intake according to an embodiment of the present invention.

In use, the precombustion air intake apparatus 10 may be installed either aftermarket or at a factory to an internal combustion engine and positioned between the traditional air filter 16 and the engine intake where incoming air is mixed with fuel and combusted for operation of the piston/cylinder combinations, whereby engine power is generated. In the normal course of engine operation, and exhaust stream is generated and expelled into the ambient air via an exhaust pipe or the like. This exhaust stream is often measured and analyzed to determine how clean or dirty it may be, the cleanliness of the exhaust stream being indicative of the efficiency of combustion and usually being correlated to vehicle mileage. With regard to the present invention, the incoming ambient airstream may be modified to include a heightened and increased volume of nitric oxide, hydrocarbons, and oxygen so as to form first and second modified airstreams prior to and upstream of an engine's normal intake and combustion. As explained above, use of the present invention results in more thorough combustion, decreased levels of carbon dioxide in the exhaust stream, and overall improved fuel efficiency. Specifically, once the twice enhanced air stream travels downstream and is combined with fuel and combusted, an exhaust stream exits the engine and has been shown to have at least 20%-25% less carbon dioxide and to have removed all of the carbon monoxide, hydrocarbons, and nitric oxide when compared to a traditional exhaust stream, i.e., to be more fully combusted significantly cleaner.

It is understood that while certain forms of this invention have been illustrated and described, it is not limited thereto except insofar as such limitations are included in the following claims and allowable functional equivalents thereof.

The invention claimed is:

1. An air intake apparatus for reforming air in a combustion engine upstream of combustion thereof, said air intake apparatus comprising:
an air intake tube defining a channel extending between an inlet end and an outlet end opposite said inlet end, said inlet end being configured to receive an unmodified ambient air stream from outside the combustion engine and the outlet end being in communication with a combustion assembly associated with the combustion engine;
a first stream modifier chamber positioned adjacent said inlet end of said air intake tube for operatively receiving the unmodified ambient air stream, said first stream modifier chamber being operative to generate nitric oxide when electrically energized so that said unmodified ambient air stream is modified into a first modified air stream rich in nitric oxide and hydrocarbons; and
a second stream modifier chamber positioned downstream from and in fluid communication with said first stream modifier chamber, said second stream modifier chamber including a magnetic field that causes additional oxygen atoms from said unmodified ambient air stream to bond with the hydrocarbons associated with said first modified air stream so as to form a second modified air stream rich in oxygen.

2. The air intake apparatus as in claim 1, wherein said air intake tube is configured to receive and direct said unmodified ambient air stream in a downstream direction toward said outlet end.

3. The air intake apparatus as in claim 1, wherein said first stream modifier chamber includes a plurality of spark plugs and an ignition controller in electrical communication with a battery associated with the combustion engine, said ignition controller being operative to actuate said plurality of spark plugs to generate sparks.

4. The air intake apparatus as in claim 3, wherein said plurality of spark plugs includes a cluster of eight spark plugs arranged to direct said sparks into said channel, said sparks each having a high temperature that induces nitrogen and oxygen in the unmodified ambient air stream to form nitric oxide and hydrocarbons so that said unmodified ambient air stream is modified into a first modified air stream rich in nitric oxide.

5. The air intake apparatus as in claim 3 further comprising an ignition coil positioned intermediate and in electrical communication with said battery and said plurality of sparkplugs, said ignition coil being electrically operative to convert low voltage current from the battery into high voltage current for receipt by said plurality of sparkplugs.

6. The air intake apparatus as in claim 1, wherein said second stream modifier chamber includes at least one magnet positioned adjacent to and downstream of said air intake tube, said at least one magnet being in magnetic communication with said unmodified ambient air stream and causing oxygen molecules therefrom to bond to said hydrocarbons in said first modified air stream so to form said second modified air stream.

7. The air intake apparatus as in claim 6, wherein said second stream modifier chamber includes three GMX400 magnets positioned in series along said air intake tube and each being in magnetic communication with said first modified air stream and causing more oxygen to bond to said hydrocarbons associated with said first modified air stream so as to form said second modified air stream.

8. The air intake apparatus as in claim 7, wherein an exhaust stream associated with said second modified air stream when combusted by operation of said combustion engine has a volume of carbon dioxide and hydrocarbons that is less than a volume of carbon dioxide and hydrocarbons in another exhaust stream associated with said unmodified ambient air stream combusted by operation of said combustion engine.

9. The air intake apparatus as in claim 8, wherein said exhaust stream associated with said second modified air stream, when combusted by operation of said combustion engine, has a volume of 20% less carbon dioxide than combustion of said unmodified ambient air stream.

10. The air intake apparatus as in claim 9, wherein said exhaust stream associated with said second modified air stream, when combusted, has 0% carbon monoxide, hydrocarbons, and nitric oxide.

11. An air intake apparatus that improves fuel economy of a combustion engine by modifying an air stream upstream of being mixed with fuel and combusted, said air intake apparatus comprising:
an air intake tube defining a channel extending between opposed inlet and outlet ends, said inlet end being configured to receive an unmodified ambient air stream from outside the combustion engine and the outlet end being in communication with a combustion assembly associated with the combustion engine;
a first stream modifier chamber positioned adjacent said inlet end of said air intake tube for operatively receiving said unmodified ambient air stream, said first stream modifier chamber having a plurality of spark plugs operative to generate nitric oxide and hydrocarbons when electrically energized such that said unmodified ambient air stream is modified into a first modified air stream that is rich in nitric oxide; and
a second stream modifier chamber positioned downstream from and in fluid communication with said first stream modifier chamber, said second stream modifier chamber including at least one magnet in magnetic communication with said air intake tube that causes additional oxygen atoms from said unmodified ambient air stream to combine with the first modified air stream so as to form a second modified air stream rich in nitric oxide;
wherein an exhaust stream associated with said combustion engine has a volume of carbon dioxide and hydrocarbons when said second modified air stream is combusted by operation of said combustion engine that is less than a volume of carbon dioxide and hydrocarbons in another exhaust stream when said unmodified ambient air stream is combusted by operation of said combustion engine.

12. The air intake apparatus as in claim 11, wherein said exhaust stream associated with said second modified air stream when combusted by operation of said combustion engine has a volume of 20% less carbon dioxide than combustion of an unmodified air stream and has 0% carbon monoxide, hydrocarbons, and nitric oxide.

13. The air intake apparatus as in claim 11, wherein an exhaust stream associated with said combustion engine has a volume of carbon dioxide and hydrocarbons when said second modified air stream is combusted by operation of said combustion engine that is at least 25% less than a volume of carbon dioxide and hydrocarbons in another exhaust stream when said unmodified ambient air stream is combusted by operation of said combustion engine.

14. The air intake apparatus as in claim 11, wherein said first stream modifier chamber includes an ignition controller in electrical communication with a battery associated with the combustion engine, said ignition controller being operative to actuate said plurality of spark plugs to generate sparks.

15. The air intake apparatus as in claim 11, wherein said plurality of spark plugs includes a cluster of eight spark plugs arranged to direct said sparks into said channel, said sparks each having a high temperature that induces nitrogen and oxygen in the unmodified ambient air stream to form nitric oxide and hydrocarbons so that said unmodified ambient air stream is modified into a first modified air stream rich in nitric oxide.

16. The air intake apparatus as in claim 14, further comprising an ignition coil positioned intermediate and in electrical communication with said battery and said plurality of sparkplugs, said ignition coil being electrically operative to convert low voltage current from the battery into high voltage current for receipt by said plurality of sparkplugs.

17. The air intake apparatus as in claim 11, wherein said at least one magnet includes three GMX400 magnets positioned in series along said air intake tube and each being in magnetic communication with said first modified air stream and causing more oxygen to bond to said nitric oxide in said modified air stream to form said second modified air stream.

18. A method of air intake that improves fuel economy of a combustion engine by modifying an air stream upstream of being mixed with fuel and combusted, said method comprising:
receiving an unmodified ambient air stream from outside the combustion engine into an air intake tube defining a channel extending between opposed inlet and outlet ends, said inlet end being configured to receive the unmodified ambient air stream and the outlet end being in communication with a combustion assembly associated with the combustion engine;
receiving said unmodified ambient air stream into a first stream modifier chamber having a plurality of spark plugs operative to generate nitric oxide when electrically energized such that said unmodified ambient air stream is modified into a first modified air stream that is rich in nitric oxide;
receiving said first modified ambient air stream and a remnant of said unmodified ambient airstream into a second stream modifier chamber positioned downstream from and in fluid communication with said first stream modifier chamber, said second stream modifier chamber magnetically causing oxygen from said remnant of said unmodified ambient air stream to combine with said hydrocarbons so as to form a second modified air stream rich in oxygen;
wherein an exhaust stream associated with said combustion engine has a volume of carbon dioxide and hydrocarbons when said second modified air stream is combusted by operation of said combustion engine that is less than a volume of carbon dioxide and hydrocarbons in another exhaust stream when said unmodified ambient air stream is combusted by operation of said combustion engine.

19. The method of air intake as in claim 18, wherein said exhaust stream associated with said second modified air stream, when combusted by operation of said combustion engine, has a volume of 20% less carbon dioxide than combustion of an unmodified stream and has 0% carbon monoxide, hydrocarbons, and nitric oxide.

20. The of air intake as in claim 18, wherein said plurality of spark plugs includes a cluster of eight spark plugs arranged to direct said sparks into said channel, said sparks each having a high temperature that induces nitrogen and oxygen in the unmodified ambient air stream to form nitric oxide and hydrocarbons so that said unmodified ambient air stream is modified into a first modified air stream rich in nitric oxide.

21. The method of air intake as in claim 20, wherein said second stream modifier chamber includes three GMX400 magnets positioned in series along said air intake tube and each being in magnetic communication with said first modified air stream and causing said hydrocarbons to attract additional oxygen molecules so as to form said second modified air stream ich in oxygen.

22. An air intake apparatus that improves fuel economy of a combustion engine by modifying an air stream upstream of being mixed with fuel and combusted, said air intake apparatus consisting of:
an air intake tube defining a channel extending between opposed inlet and outlet ends, said inlet end being configured to receive an unmodified ambient air stream from outside the combustion engine and the outlet end being in communication with a combustion assembly associated with the combustion engine;
a first stream modifier chamber positioned adjacent said inlet end of said air intake tube for operatively receiving said unmodified ambient air stream, said first stream modifier chamber having a plurality of spark plugs operative to generate nitric oxide and hydrocarbons when electrically energized such that said unmodified ambient air stream is modified into a first modified air stream that is rich in nitric oxide; and
a second stream modifier chamber positioned downstream from and in fluid communication with said first stream modifier chamber, said second stream modifier chamber including at least one magnet in magnetic communication with said air intake tube that causes additional oxygen atoms from said unmodified ambient air stream to combine with the first modified air stream so as to form a second modified air stream rich in nitric oxide;
wherein an exhaust stream associated with said combustion engine has a volume of carbon dioxide and hydrocarbons when said second modified air stream is combusted by operation of said combustion engine that is less than a volume of carbon dioxide and hydrocarbons in another exhaust stream when said unmodified ambient air stream is combusted by operation of said combustion engine.

* * * * *